The present application is a division of copending U.S. application Serial No. 441,704 filed July 7, 1954, and now Patent No. 2,862,822.

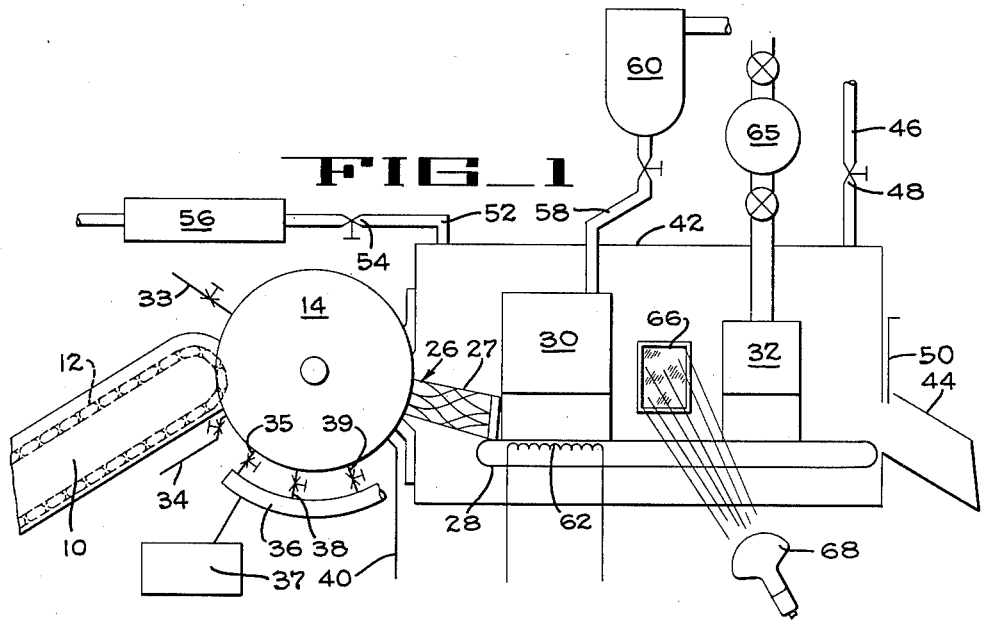
FIG_1
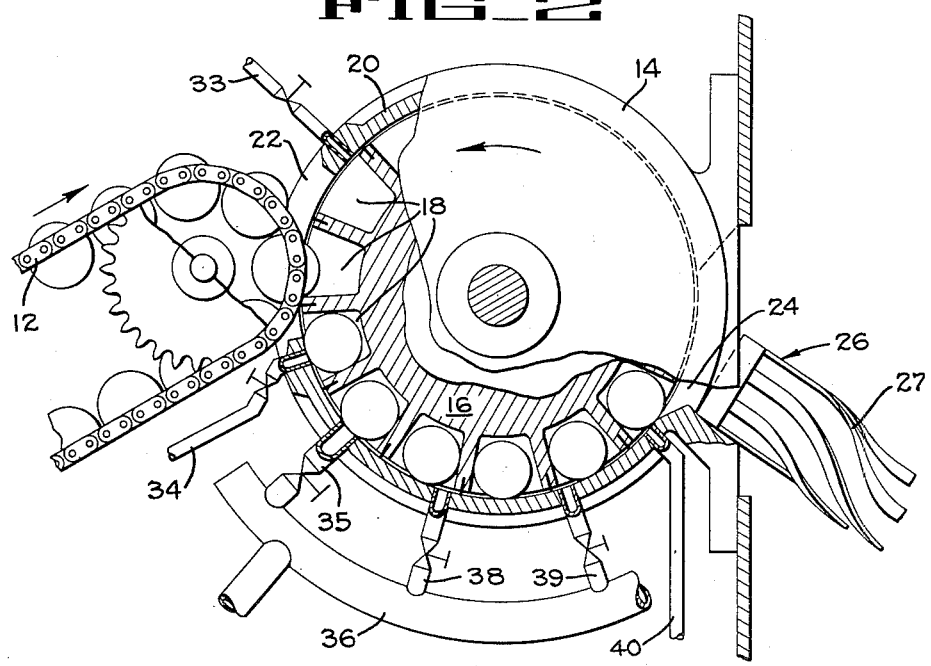
FIG_2
INVENTOR
ROBERT A. WHITMORE
ATTORNEY 3,016,666
APPARATUS FOR PRESERVING FOOD PRODUCTS IN SEALED CONTAINERS OF VITREOUS MATERIAL
Robert A. Whitmore, Riverside, Calif., assignor to FMC Corporation, a corporation of Delaware
Original application July 7, 1954, Ser. No. 441,704, now Patent No. 2,862,822, dated Dec. 2, 1958. Divided and this application Nov. 5, 1958, Ser. No. 772,057
4 Claims. (Cl. 53—112)

The present invention relates to apparatus for preserving food products in sealed containers, and especially in sealed containers of vitreous material such as glass jars. More particularly the present invention relates to apparatus for carrying out methods of preserving food products by sterilizing them, filling them in sterile condition into presterilized containers in a sterile atmosphere, and closing the filled containers with pre-sterilized lids in a sterile atmosphere, which methods are generally known under the name of aseptic canning.

The most inexpensive and, at the same time, the most effective method of sterilizing food products and containers is sterilization by the application of heat. One of the obstacles to preserving food products in vitreous containers has, therefore, been the frangibility of such containers under the stresses imposed upon them during and after the application of sterilization temperatures.

It is an object of the present invention to provide an improved apparatus for aseptically canning food products in vitreous containers, such as glass jars.

Another object is to provide apparatus for preserving food products in glass containers in a manner assuring a minimum of breakage due to thermal-shock.

Another object is to provide apparatus for rapidly sterilizing vitreous containers without incurring a high percentage of breakage.

Another object is to provide apparatus for sterilizing vitreous containers and thereafter filling a sterile food product in cool condition into the containers within a minimum of time without risk of breakage due to heat shock.

Hitherto it was commonly believed that glass containers must not be subjected to temperature differentials of more than 75° F. to maintain heat breakage at a tolerably low level, for which reason it was the general practice in the art of canning food products in glass containers to heat the glass containers gradually to moderate sterilization temperatures and, after sterilization had been accomplished, to cool them gradually to a temperature less than 75° F. above the temperature of the food product before the food product was actually filled into the containers.

I have discovered that cool glass containers may, without risk of breakage, be rapidly subjected to such high sterilization temperatures as will thoroughly sterilize their surfaces in a very brief period of time, provided the high temperatures are established by the application of saturated steam to the containers. I have also found that upon accomplishment of adequate sterility, cool food products may be immediately filled into the sterilized containers without danger of breakage, provided the sterilization treatment was so short as to confine heating of the glass containers to a very thin surface stratum, and provided no time is lost after the sterilization treatment in filling the cool food product into the containers, and the outer surface of the heated containers is safeguarded from contact with any cool substance.

By the described flash sterilization of glass containers in an atmosphere of saturated steam I am able to dispense with, or greatly reduce, the costly and time-consuming pre-heating operations, and by filling the sterilized containers immediately thereafter with cool food products I am able to dispense with costly and time-consuming cooling operations. I encounter far less breakage due to heat-shock than would occur if conventional precautionary pre-heating and cooling operations had been adopted. Thus, with my novel method of sterilizing glass containers and filling them with cool food products, I am able to save time and operational costs and, in addition, I have a much lower percentage of breakage due to heat-shock than normally expected.

I am unable to account for these remarkable and thoroughly unexpected results with certainty, but I believe one possible explanation to be as follows: While any surface defect of a body of glass will result in crack formation when the area around this defect is subjected to tensional stresses, it can be demonstrated by experiment that the incidence of crack formation is greatly reduced when the area is held in a state of compression. The flash sterilization of the present invention, while effective to kill all harmful microorganisms on the surface of a glass container when carried out through the medium of saturated steam, is proportioned to heat only a very thin stratum of glass on either side of the container wall, with a great portion of the interior of the container wall remaining relatively cool. When a cool substance, such as cool water or a cool food product, is filled into the flash-sterilized container, the heat of the thin glass stratum adjacent the inner surfaces of the container wall is quickly transmitted to and absorbed by the cool food product while the glass stratum adjacent the outer container surfaces remains hot. The shrinkage resulting from the sudden cooling of the thin glass stratum adjacent the inner container surfaces places the hot glass stratum adjacent the outer container surfaces, through the cohesive force of the glass mass, into a state of compression during the more gradual cooling of the outer container surfaces, and as a result thereof the development of cracks in the glass container is greatly reduced even though its outer surfaces may contain defects such as scratches, stones, checks, etc. This theory is borne out by the fact that the incidence of container breakage due to heat-shock increases rapidly the more time is allowed to elapse between sterilization of the glass containers and the moment when they are filled with the cool food product, or when the sterilization process itself is increased in length beyond the minimum time necessary to obtain adequate sterility of the container surfaces by the application of high sterilization temperatures. In the latter case the walls of the glass jars are heated through and through, and in the former case the highly heated outer stratum of the inner wall of the glass container has time to transmit its heat into the interior of the glass walls.

In the accompanying drawing:

FIG. 1 is a diagrammatic elevation illustrating the consecutive stages of an exemplary aseptic canning process embodying the apparatus of the present invention, and FIG. 2 is a partly diagrammatic, fragmentary elevation of some of the component mechanisms shown in FIG. 1.

In FIG. 1 the block 10 represents an enclosure through which an endless cup conveyor 12 carries glass jars with their axes disposed transversely of the conveyor (FIG. 2) in a continuous procession to a rotary sterilizing valve represented by the circle 14. Within said enclosure a number of nozzles (not shown) may be arranged to direct jets of steam into the interior of the jars before they pass into the sterilizing valve to purge them of air.

An exemplary embodiment of the sterilizing valve is illustrated in greater detail in FIG. 2. Said valve comprises a rotor in the form of a star wheel 16 that is arranged to turn about a horizontal axis and which is provided with an endless sequence of radially receding peripheral pockets 18, each of which is adapted to receive an individual jar with its axis disposed parallel to the axis of the star wheel. The conveyor 12 and the star wheel 16 operate in synchronism so that the former may consecutively deliver individual jars into the pockets 18 as they pass the discharge end of the conveyor in an endless succession. The rotary valve 14 also comprises a cylindrical jacket or enclosure 20 which surrounds the star wheel 16 except for a jar receiving aperture or window 22 at a sector adjacent the discharge end of the conveyor 12, and a jar discharging aperture or window 24 that is located within a bottom quadrant of the star wheel so that as the pockets 18 pass said window during operation of the valve, any jars contained therein will drop from the pockets through the window 24 into an inclined gravity chute 26. The gravity chute delivers them through a twister section 27 in upright position to an endless conveyor 28 which conducts them in succession to the product filling machine 30 and the lid closing machine 32. Immediately before the star wheel pockets 18 reach the jar receiving window 22 during practical operation of the valve 14, steam is injected into them through a small pipe 33 to sweep out any air that may be contained therein, and after a pocket has received a jar through the window 22 and before it moves fully underneath the cylindrical wall of the jacket 20, steam is again injected into the pocket and the jar contained therein, through another small pipe 34 to sweep out any residual air before the pocket is fully closed off from the outside atmosphere. Then, after the pocket is fully closed off from the outside atmosphere, saturated steam is injected in quantity into said pocket through a large pipe 35 that is supplied through a manifold 36 from a suitable reservoir 37 of saturated steam maintained at a controlled pressure, and additional amounts of saturated steam are injected into the pocket at successive points of its rotary path from window 22 to window 24 through additional pipes supplied from the same manifold 36, such as the pipes 38 and 39 shown in FIG. 2. Then, before the pocket reaches the discharge window 24 it passes a relief pipe 40 through which the pressure established therein by the saturated steam atmosphere is released.

The discharge window 24 of the sterilizing valve leads into a sterile chamber 42 that encloses the gravity chute 26, the endless conveyor 28, the product filling machine 30 and the lid closing machine 32 and forms a discharge tunnel 44 for the closed containers. Prior to practical performance of the described aseptic canning system the chamber 42 with all the equipment disposed therein is thoroughly sterilized, which may be accomplished by delivering saturated steam at a sterilizing temperature into the chamber 42 through a conduit 46 that is controlled by a manually operable valve 48, while the discharge tunnel 44 is closed by means of a suitable slide gate 50. After the saturated steam has been applied to the interior of the chamber 42 for a period of time sufficient to effect proper sterilization of said chamber and all of the equipment enclosed therein, the supply of the sterilizing medium is shut off by appropriate manipulation of control valve 48, and the chamber 42 with the equipment therein is maintained in sterile condition by the constant flow therethrough of a cool sterile gas, such as completely sterile air, which is delivered into the chamber 42 from a sterilizer 56 through a suitable conduit 52 controlled by a manually operable valve 54 near the entrance point of the containers and which discharges from the chamber 42 through the aforementioned container discharge tunnel 44, after the slide gate 50 has been withdrawn therefrom. In the sterilizer 56 the gaseous medium delivered into the chamber 42 may be sterilized in any suitable manner, such as by means of filters or by the application of sterilizing temperature, but when passed through the chamber 42 it should preferably be at a temperature below the boiling point of water.

The product filling machine 30 is supplied with a cool sterile food product through a suitable conduit 58 from a sterile food product storage tank represented by the block 60. The product filling machine 30 should be located as closely adjacent to the discharge window 24 of the rotary sterilizer valve 14 as possible so that the hot sterile glass containers are filled within a minimum of time after emergence from the sterilizer valve with the sterile food product that may be of room temperature and, in any case, of a temperature substantially below the boiling point of water. To prevent the condensation of water in the containers as they move underneath the filling machine 30 in the cool atmosphere prevailing in chamber 42, local heating units may be provided in the chamber 42 adjacent the filling machine, as indicated by the resistor 62 in FIG. 1.

After a container has been filled with the cool food product, the conveyor 28 carries it to the lid closing machine 32 which may be of conventional design comprising a lid sterilizing chamber 65, wherein the lids are sterilized by the application of saturated steam under pressure and from where they are valved to the actual lid closing mechanism that lies entirely within the chamber 42 and is maintained in sterile condition by the constant flow of a sterile gaseous medium through said chamber, as explained hereinbefore.

In order that the operation of the equipment within chamber 42 may be observed, one or both of the side walls of said chamber may be provided with observation windows, as indicated at 66 in FIG. 1, and to prevent fogging of these windows through the condensation of water vapor thereon within the cool atmosphere prevailing in chamber 42, means should be provided to apply heat to these windows, such as the infrared lamp 68 indicated in FIG. 1, which is arranged to throw its radiation cone against the window 66 from a point exteriorly of the chamber 42.

The hereinbefore mentioned discharge tunnel 44 should be downwardly inclined to form a discharge chute or slide through which the sealed containers are transported out of chamber 42 without the aid of mechanism that has components which move out of the sterile atmosphere within the chamber into the bacteria-laden atmosphere outside and back again into the atmosphere within the chamber. By making the container discharge tunnel 44 sufficiently long, any danger that harmful microorganisms may enter the interior of chamber 42 through said tunnel is effectively prevented by the constant stream of sterile gas that passes with the containers through the tunnel into the outside atmosphere.

In an exemplary performance of the process of the invention glass jars approximately 2 inches in diameter and 4 inches high, commonly referred to as 5-ounce jars, were delivered into the air purging unit 10. In passing through the sterilizer valve 14 these jars were subjected to an atmosphere of saturated steam at a temperature about 216° F. for a period of approximately one second, which was sufficient to thoroughly sterilize their surfaces. The atmosphere within the chamber 42 was held at a temperature well below 100° F., and within less than 2 seconds after emergence from the sterilizer valve the superficially heated glass jars were filled with a food product of a temperature between 90° F. and 100° F. No breakage of any of the jars due to heat shock could be observed, although some of the jars exhibited defects on their outer surfaces, such as scratches or checks. After closure in the lid closing machine the jars were ejected through a discharge chute 44 that was 6 inches long. No spoilage of any form could be observed amongst the food products in the glass jars, even after the jars had been stored for 12 months at room temperature.

While I have described my invention with the aid of an exemplary process and exemplary apparatus, it will be understood that I do not wish to be limited to the specific temperatures or times of treatment given by way of example nor to the particular equipment illustrated and described, all of which may be departed from without departing from the scope and spirit of the invention.

Having thus described my invention, what I claim as new and desire to protect by Letters Patent is:

1. A continuous sterilizing mechanism for containers comprising a rotor having a sequence of pockets along its periphery adapted to receive containers therein, an enclosure surrounding said rotor and having an aperture adapted to admit containers into the pockets of the rotor and angularly spaced therefrom an aperture adapted to discharge containers from the pockets of the rotor, means for directing steam into the pockets of the rotor as they approach said container admitting aperture during rotation of said rotor to preheat the pockets and to displace air from said pockets, means for directing saturated steam under controlled pressure into said pockets at consecutive points of their rotary path from said container admitting aperture to said container discharge aperture, and means for releasing the pressure in said pockets as they approach said container discharge aperture.

2. A continuous sterilizing mechanism for containers comprising a rotor having a sequence of pockets along its periphery adapted to receive containers therein, a cylindrical enclosure surrounding said rotor and having an aperture adapted to admit containers into the pockets of the rotor and angularly spaced therefrom, an aperture adapted to discharge containers from the pockets of the rotor, means for directing steam into the pockets of the rotor as they approach said container admitting aperture during rotation of said rotor to preheat the pockets and to displace air from said pockets, means for directing steam into the pockets as they are moving out of communication with said container admitting aperture, means for directing saturated steam under pressure into said pockets at consecutive points of their rotary path from said container admitting aperture to said container discharge aperture, and means for releasing the pressure in said pockets as they approach said container discharge aperture.

3. Apparatus for preserving a food product in a frangible vitreous container comprising an enclosure having an inlet opening and an outlet opening; a container sterilizer defining a sealed pressure chamber intermittently communicating with the inlet opening of said enclosure and including means for subjecting each vitreous container to saturated steam for a period of time sufficient to adequately sterilize its surfaces but insufficient to heat more than a thin outer stratum thereof to a sterilizing temperature, a pocketed rotor included in said sterilizer for intermittently delivering the container into said enclosure through said inlet opening, and drive means connected to said rotor for driving the same; a container filling machine in said enclosure adjacent said inlet opening and adapted to direct product into the container immediately upon entry into said enclosure and prior to penetration of heat to the internal wall structure of the vitreous container; a container closing machine in said enclosure adjacent said filling machine; and means for maintaining the interior of said enclosure and the mechanisms therein in a sterile condition including means for passing a sterile gaseous fluid at a pressure above atmospheric pressure through said enclosure.

4. Apparatus for sterilizing a vitreous container comprising a cylindrical sterilizing enclosure, means for directing saturated steam at approximately 316° F. into said enclosure, a star wheel mounted for rotary movement in said chamber to divide said chamber into a plurality of sterilizing pockets and to receive and move containers through said chamber and subject the containers to the atmosphere of saturated steam, and means for driving said star wheel at a rate which maintains each of the containers in its associated pockets for an interval of less than 2 seconds which is sufficient to obtain adequate sterilization of the surfaces of the container but insufficient to permit more than a thin outer stratum of the vitreous container to be heated to a sterilizing temperature.

References Cited in the file of this patent

UNITED STATES PATENTS

| | | |
|---|---|---|
| 1,270,797 | Dunkley | July 2, 1918 |
| 2,209,315 | Ball | July 30, 1940 |
| 2,268,289 | Kronquest | Dec. 30, 1941 |
| 2,337,061 | Murch | Dec. 21, 1943 |
| 2,369,762 | Stewart et al. | Feb. 20, 1945 |
| 2,380,984 | Moeller | Aug. 7, 1945 |
| 2,514,027 | Clifcorn | July 4, 1950 |
| 2,575,863 | Clifcorn | Nov. 20, 1951 |
| 2,660,513 | Ball | Nov. 24, 1953 |
| 2,685,520 | Martin | Aug. 3, 1954 |
| 2,696,937 | Johnson et al. | Dec. 14, 1954 |